Figure 4:
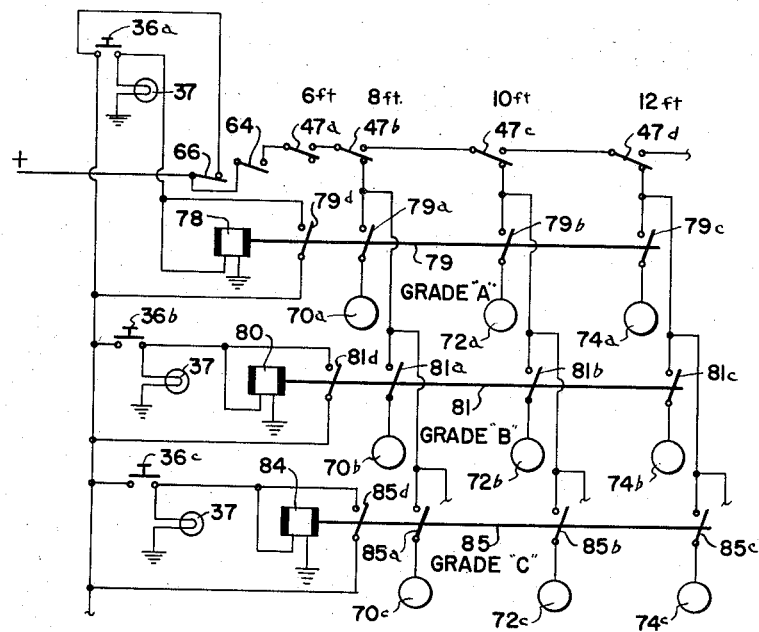

July 15, 1958     P. SLOAN     2,843,321
ARTICLE TALLYING APPARATUS
Filed Jan. 3, 1956     2 Sheets-Sheet 1
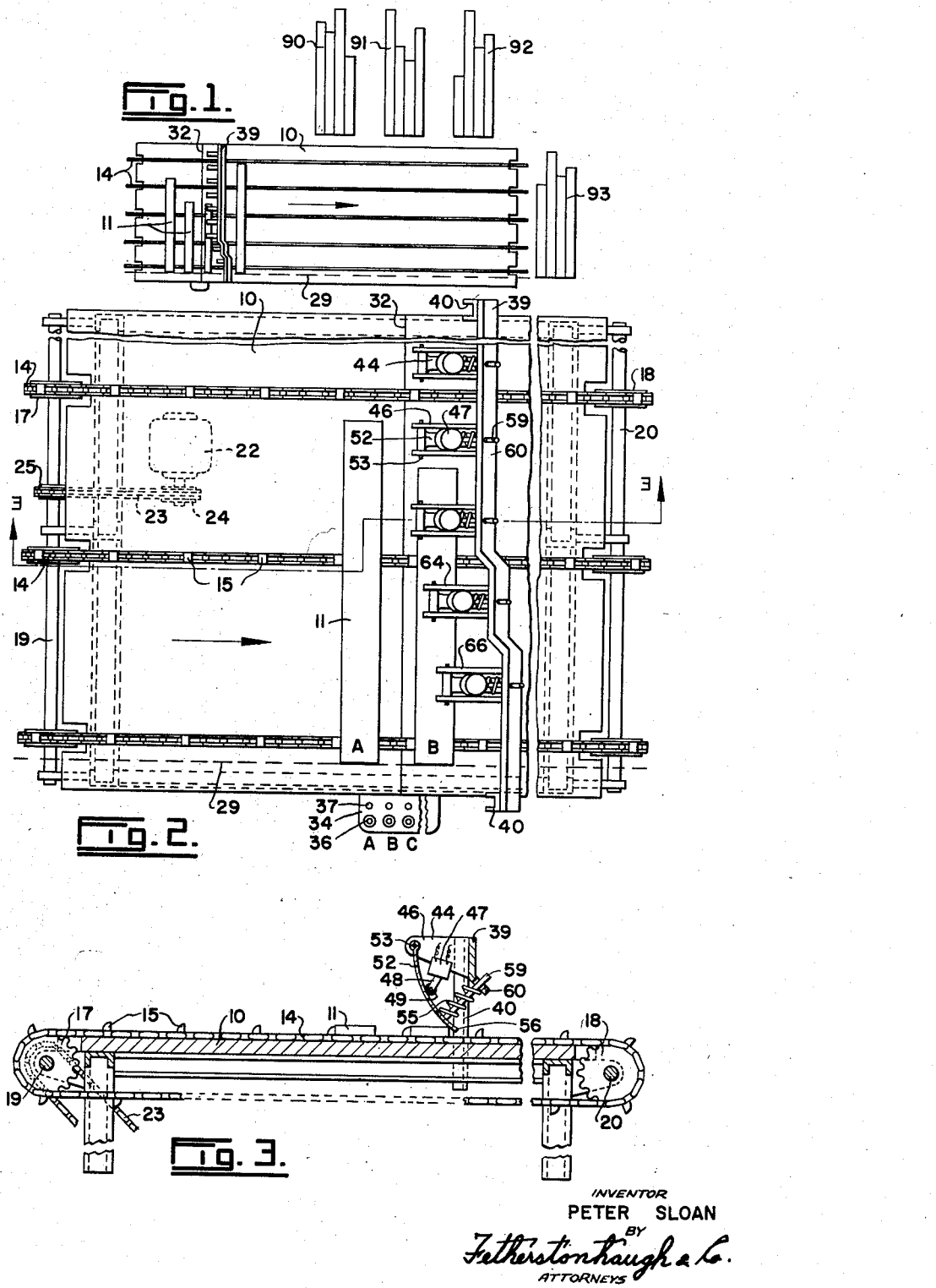
INVENTOR
PETER SLOAN July 15, 1958 P. SLOAN 2,843,321
ARTICLE TALLYING APPARATUS
Filed Jan. 3, 1956 2 Sheets-Sheet 2

INVENTOR
PETER SLOAN
BY
Fetherstonhaugh & Co.
ATTORNEYS

United States Patent Office 2,843,321
Patented July 15, 1958

2,843,321

ARTICLE TALLYING APPARATUS

Peter Sloan, Vancouver, British Columbia, Canada

Application January 3, 1956, Serial No. 557,159

7 Claims. (Cl. 235—98)

This invention relates to apparatus for tallying articles of different lengths according to length.

While this apparatus is particularly designed for tallying lumber according to length, it may be used for other purposes, such as tallying canned goods according to the length or height of the cans. For the sake of convenience, the apparatus will hereinafter be described in connection with lumber.

An object of the present invention is the provision of apparatus for tallying lumber according to the length thereof, said lumber travelling through the apparatus in random lengths.

Another object is the provision of apparatus for tallying lumber according to grade and length.

In this apparatus, the lumber is moved along a course substantially normal to the lengths thereof. The lumber may be so positioned by hand or by mechanical means, but this does not form part of the invention. If the lumber is to be tallied according to grade as well as length, a plurality of electric control switches are provided at a point where the operator can see the lumber before it reaches the registering section of the apparatus. There is a switch for every grade of lumber to be handled by the machine. The apparatus described herein is designed for three grades only, but it will be obvious that there is no reasonable limit to the number of grades that may be handled in apparatus of this nature. The operator may be a grader, or the lumber may have been previously graded and marked according to grade. In any case, when a board reaches a certain point, the operator presses the button that corresponds to the grade of that piece. The apparatus includes a plurality of electrical counters, and there are several of these counters for each grade. In each grade, there is one counter for each of a number of different lengths. Here again, the illustrated machine is for three lengths, but there is no reason why the machine cannot be arranged to handle as many different lengths as desired.

When each board passes through the registering section, it operates the counter for its particular length and in the grade group selected by the operator.

One form of apparatus according to the present invention for tallying articles, such as lumber, of different lengths according to length, comprises conveying means for moving articles along a course substantially normal to the lengths thereof, a datum line extending in the direction of travel of the conveying means near a side thereof and along which an end of each article travels, a plurality of electrical operating units spaced outwardly at predetermined intervals from the datum line and across the course, all said units overlapped by an article moving past them being operated by said article, a counter for and operated by each unit, and means operated by each unit for cutting every unit between said each unit and the datum line off from its counter, whereby operation of all the units results in the counter of said each unit only being operated.

If the apparatus is to be used for grading as well as counting according to length, there are a plurality of counters for each electrical operating unit, and said counters are arranged in groups with one of each unit in each group, and means for selectively connecting all the counters of each group to their respective units.

Figure 5:
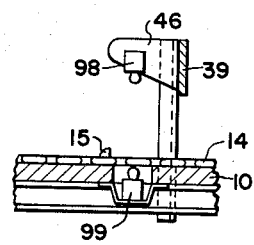

An example of this tallying apparatus is illustrated in the accompanying drawings, in which, Figure 1 is a reduced plan view of apparatus for tallying seven different lengths of lumber, Figure 2 is an enlarged plan view of the apparatus showing the equipment for tallying three different lengths only, Figure 3 is a longitudinal section taken on the line 3—3 of Figure 2, illustrating mechanically-operated switch means, Figure 4 is a wiring diagram of the apparatus, showing the set-up for three grades and three different lengths of lumber, and Figure 5 is a fragmentary section through the registering part of the apparatus, illustrating an alternative form of actuating means employing photoelectric cells.

Referring to Figures 1 to 3 of the drawings, 10 is an elongated table having suitable means for moving boards 11 along a course substantially normal to the lengths thereof. In this example, a plurality of spaced endless conveyor chains 14 are provided for this purpose, said chains having a plurality of transversely aligned lugs 15 projecting outwardly therefrom. The lugs on each chain are spaced apart a predetermined distance, and this distance is sufficient to allow the boards to lie on the chains between the lugs. Each chain 14 extends around sprockets 17 and 18 fixedly mounted on common shafts 19 and 20 at the opposite ends of the machine. These chains are moved in unison in any suitable manner, such as by an electric motor 22 which is connected to shaft 19 by chain 23 and sprockets 24 and 25, see Figures 2 and 3.

As previously stated, the boards 11 are spaced apart as they move along the course over the top of table 10, and the lugs 15, being spaced apart, prevent any board from getting too close to any other board. The boards may be spaced and aligned properly across the machine by hand, or by special mechanism for this purpose, not shown. As it is necessary to have corresponding ends of the boards travelling along a straight line, a datum line 29 is provided along one edge of the table parallel with the course of travel. This may be merely a line, as shown, which indicates that the board ends are moving along the proper course, or it may be in the form of an upright fence against which the ends of the boards slide. The main thing is that the ends of the boards at one side of the machine must travel down a predetermined line or course.

If the boards are to be tallied according to grade as well as their lengths, another mark 32 may be placed on the machine extending across the course of the boards and parallel with the lengths thereof. This is intended to give the operator a line across which the boards move where he can make his grade selections. As previously stated, the operator may be a grader, or the boards may have been previously graded and marked to indicate to the operator the grades thereof. A support 34 is mounted on the side of table 10 near the transverse line 32. This support carries a plurality of electric push button actuating switches 36, one for each grade of lumber to be handled by the machine. There is also a pilot lamp 37 for each switch 36.

Immediately behind line 32, with reference to the direction of movement of the boards, a supporting bar 39 is carried at its opposite ends by standards 40 extending upwardly from table 10. This bar carries a plurality of the units 44 are identical, one only will now be described electrical operating units spaced outwardly at predetermined intervals from the datum line 29. Figures 2 and 3 illustrate electrical operating switch units 44 for this purpose, there being three of these illustrated in Figure 2. As in detail.

Each switch unit 44 includes a bracket 46 projecting laterally from supporting bar 39 and carrying an electric operating switch 47. This switch has an operating finger 48 projecting downwardly therefrom with a roller 49 on its outer end. When the finger is in one position, the switch closes one circuit, and when it is moved to the opposite position, the switch closes another circuit and opens the first one. A narrow curved plate 52 is pivotally mounted at 53 on bracket 46 and extends downwardly and beneath roller 49, said plate being resiliently held by a spring 55 at a point with its lower edge 56 spaced a little above the level of conveyor chains 14. This spring is mounted on a rod 59 which extends upwardly from the plate freely through a flange 60 carried by bar 39. The spring is located between the flange and the plate. By referring to Figure 3, it will be seen that the lower edge 56 of the plate 52 is normally maintained below the upper face of boards 11 located on the chains 14.

When plate 52 is in its normal position, switch 47 is set to close one circuit, and when the lower end of the plate is swung upwardly by a board 11 moving therebeneath, the switch is moved to open the first circuit and close another. The latter circuit is opened when the switch and plate return to their normal positions.

The plates 52 of all the switch units 44 are aligned transversely of table 10. This means that when a board passes beneath the switch units, it swings all the plates 52 within its length at the same time.

If desired, a main registering switch unit 64 and a restoring switch unit 66 may be carried by supporting bar 39. These last two units are preferably identical with units 44 and do not need to be described herein. However, unit 64 includes a switch hereinafter referred to as the main switch, and unit 66 a switch referred to as the restoring switch. It will be noted that bar 39 is so shaped that unit 64 is a little behind the units 44 and unit 66 is a little behind unit 64, these directings being considered with reference to the direction of movement of the boards along the course over table 10.

Each switch 47 is electrically connected to a plurality of counters and these counters are arranged in groups with one of each switch in each group.

Figure 4 is a complete wiring diagram for tallying three different lengths, e. g., 6 feet, 8 feet, and 10 feet; and three grades, e. g. grades A, B and C.

Switch 47a is connected through switch 47b to counters 70a, 70b, and 70c; while switch 47b is connected through switch 47c to counters 72a, 72b, and 72c; and switch 47c is connected through switch 47d to counters 74a, 74b, and 74c. It will be noted that counters 70a, 72a, and 74a are in group grade A; counters 70b, 72b and 74b are in group grade B; and machines 70c, 72c and 74c are in group grade C.

Switch 47a being for the shortest piece of lumber to be handled by the apparatus, namely, 6 feet, is normally open and does not close any other circuit at that time. On the other hand, switch 47b normally keeps a circuit open including switches 47a, 47c and 47d, and when switch 47b is in this position it closes a circuit including counters 70a, 70b and 70c. Similarly, switch 47c is normally in a position opening the circuit including switches 47a, 47b and 47d, and it closes another circuit including counters 72a, 72b and 72c. In the same way, switch 47d normally keeps the switch circuit open, and closes a circuit including counters 74a, 74b and 74c.

A solenoid 78 is provided for operating a normally-open selecting gang switch 79. The gang switch 79 includes switches 79a, 79b and 79c in the circuits of counters 70a, 72a and 74a. It also includes a holding switch 79d. This solenoid is in circuit with one of the grade switches 36 and its indicating lamp 37. For convenience, this grade switch will be designated 36a.

A solenoid 80 operates a normally-open selecting gang switch 81 which includes switches 81a, 81b and 81c in the circuit of counters 70b, 72b, and 74b. It also includes a holding switch 81d in circuit with a grade switch 36b, and its lamp 37.

Another solenoid 84 operates a normally-open selecting gang switch 85, said switch including switches 85a, 85b and 85c in the circuits of counters 70c, 72c, and 74c. It also includes a holding switch 85d in circuit with grade switch 36c and its lamp 37.

Main switch 64 is normally open, whereas restoring switch 66 is normally closed. Switch 64 is in the circuit of switches 47, and switch 66 is in circuit with all of switches 36.

The operation of this apparatus is as follows:

Boards 11 are moved along table 10 by the chains 14 and their lugs 15. One end of each board is positioned over the datum line 29. When a board reaches the transverse line 32, the operator presses the switch 36 corresponding to the grade of that piece of wood. For example, if the board is grade A, switch 36a is depressed to energize solenoid 78, thereby closing selecting gang switch 79. Holding switch 79d keeps the solenoid energized and lamp 37 on when switch 36a is released. This action connects grade A counters 70a, 72a and 74a through switches 79a—47b, 79b—47c and 79c—74d respectively to switches 47a, 47b and 47c, although the latter switches are at this moment open relative to the counter circuits. As the board progresses, it swings all the plates 52 in line therewith upwardly to operate their respective operating switches 47. If switch 47a alone is operated at this time, following which main switch 64 is operated by the same board, the current will flow through switches 47b—79a to cause counter 70a to register the count of one, thus tallying a 6 ft. length of grade A lumber. The board next opens restoring switch 66 to de-energize solenoid 78 and open gang switch 79. Switches 47a, 64 and 66 return to their normal positions as soon as the board clears them.

On the other hand, if several switches 47 are closed at the same time by a board, the count is registered in the appropriate counter. For example, if switches 47a, 47b and 47c are simultaneously closed, when the main switch 64 is closed, current flows through these switches and switches 47d—79c to counter 74a, thus registering a 10 ft. length of grade A lumber.

It is obvious that if switch 36b or 36c is depressed by the operator when a board passes line 32, the length of the latter will be registered in one of the counters 70b, 72b or 74b; or one of the counters 70c, 72c or 74c.

The boards passing over table 10 may be sorted according to grade and/or length. Figure 1 illustrates bundles 90, 91, 92 and 93, containing boards of different lengths, but each bundle including boards of the same grade. This machine eliminates the necessity of having to count the number of boards of different lengths in each grade group.

The counters have not been described herein since such electrical counters are well known and their actual construction and operation has nothing to do with the present invention. These counters may be such that they indicate the totals on dials, or they may record the totals on charts.

Figure 5 illustrates a slight variation in this invention. As previously stated, the electrical operating units 44, the main registering unit 64, and the restoring unit 66 of Figures 2 and 3, are mechanically operated. There is no reason why the switches of these units could not be electrically operated. For example, each of these units may include a photoelectric cell 98 carried by a bracket 46 above table 10, and another photoelectric cell 99 aligned with the first one and located beneath the chains 14 on the table. Each pair of these cells may be connected in a circuit to operate a switch which is the equivalent of one of the switches 47, 64 or 66. With this arrangement, when the beam between one pair of cells is interrupted, the switch associated with said cells is operated. This would be the same as closing one of the switches 47, 64 or 66. The rest of the grade tallying apparatus will operate as described above when the switches 47, 64 and 66 are closed.

What I claim as my invention is:

1. In apparatus for tallying articles, such as lumber, of different lengths according to length, conveying means for moving articles along a course substantially normal to the lengths thereof, a datum line extending in the direction of travel of the conveying means near a side thereof and along which an end of each article travels, a plurality of electrical operating units spaced outwardly at predetermined intervals from the datum line and across the course, all said units overlapped by an article moving past them being operated by said article, a counter for and operated by each unit, means operated by each unit for cutting every unit between said each unit and the datum line off from its counter, whereby operation of said each unit and all the units between the latter and the datum line results in the counter of said each unit only being operated, and switch means connected to each counter on the side of the cutoff means thereof remote from said counter, said switch means being positioned to be actuated by each article immediately after the latter has operated the units to operate the counter of the unit farthest from the datum line and operated by said article.

2. In apparatus for tallying articles, such as lumber, of different lengths according to length, conveying means for moving articles along a course substantially normal to the lengths thereof, a datum line extending in the direction of travel of the conveying means near a side thereof and along which an end of each article travels, a plurality of electrical operating units spaced outwardly at predetermined intervals from the datum line and across the course, all said units overlapped by an article moving past them being operated by said article, a plurality of counters for each unit, said counters being arranged in groups with one of each unit therein, means for selectively connecting all the counters of each group to their respective units, and means operated by each unit for cutting every unit between said each unit and the datum line off from its counter, whereby operation of said each unit and all the units between the latter and the datum line results in the counter of said each unit in the selected group only being operated.

3. Tallying apparatus as claimed in claim 2 including switch means connected to the counters of each unit on the side of the cutoff means thereof remote from said counters, said switch means being positioned to be actuated by each article immediately after the latter has operated the units to operate the counter in the selected group of the unit farthest from the datum line and operated by said article.

4. In apparatus for tallying articles, such as lumber, of different lengths according to length, conveying means for moving articles along a course substantially normal to the lengths thereof, a datum line extending in the direction of travel of the conveying means near a side thereof and along which an end of each article travels, a plurality of normally-open operating switches in series in a circuit, said switches being spaced outwardly at predetermined intervals from the datum line and across the course, a plurality of counters connected in parallel by normally-open selecting switches in a circuit for each operating switch normally connected thereto through the operating switch next to the former operating switch outwardly from the datum line, said counters being arranged in groups with one of each operating switch therein, and means connected to all the selecting switches of each group selectively to connect the counters of said group to their respective operating switches, all said operating switches overlapped by an article moving past them being operated by said article to close the circuit including said operating switches and each of the latter switches disconnecting the next operating switch towards the datum line off from its counter while completing the circuit to its own selected counter.

5. Tallying apparatus as claimed in claim 4 in which the means connected to all the selecting switches of each group is a solenoid in series with an actuating switch, said solenoid also being in a holding circuit which is energized when the actuating switch is operated, and including a normally-closed restoring switch in said holding circuit and located to be operated by each article moving along the course after it has operated at least one operating switch.

6. Tallying apparatus as claimed in claim 4 including a normally-open registering switch in the circuit of the operating switches located between the datum line and said operating switches and a little behind the latter with reference to the direction of movement of the articles, said registering switch when closed by an article moving past it connecting the operating switch circuit to a source of power.

7. In apparatus for tallying articles, such as lumber, of different lengths according to length, a plurality of counters corresponding to different article lengths and arranged in groups according to length, the counters of the different groups being arranged for grades, there being one counter of each group for each grade, the counters of each group being in parallel in an electrical circuit selecting switch means to selectively connect all the counters of a given grade in the different groups to their respective circuits, operating switch means to close each of the counter group circuits, means operated by each article to open and close the operating switch means of the circuit of each counter up to the length corresponding to that of said article, and means simultaneously to render each counter circuit of a length less than that of said article inoperative, whereby only a selected counter in the circuit corresponding to the length of said article is operated by the latter.

References Cited in the file of this patent

UNITED STATES PATENTS

| | | |
|---|---|---|
| 1,172,921 | Yost | Feb. 22, 1916 |
| 2,023,574 | Cohn | Dec. 10, 1935 |
| 2,048,192 | Marston | July 21, 1936 |
| 2,408,313 | Hunter et al. | Sept. 24, 1946 |
| 2,470,926 | Gieseke | May 24, 1949 |
| 2,691,486 | Work | Oct. 12, 1954 |